United States Patent [19]

Wakeman

[11] E Re. 28,672

[45] Reissued Jan. 6, 1976

[54] PLIABLE TAPE STRUCTURE

[76] Inventor: Alfred W. Wakeman, Madison Road, Durham, Conn. 06422

[22] Filed: Feb. 6, 1975

[21] Appl. No.: 547,573

Related U.S. Patent Documents

Reissue of:

[64] Patent No.: 3,751,760
Issued: Aug. 14, 1973
Appl. No.: 159,796
Filed: July 6, 1971

[52] U.S. Cl. ..... 16/150; 281/37.5
[51] Int. Cl.[2] ..... E05D 7/00
[58] Field of Search ..... 16/150; 220/30, 32; 229/44; 248/205 A; 281/37.5, 40, 41, 21 R, 22

[56] References Cited

UNITED STATES PATENTS

| | | | |
|---|---|---|---|
| 1,843,170 | 2/1932 | Meldrim | 16/150 |
| 2,611,659 | 9/1952 | Hadley | 16/150 |
| 3,279,473 | 10/1969 | Toman | 16/150 |
| 3,442,415 | 5/1969 | Glass | 16/150 |
| 3,851,353 | 12/1974 | Wakeman | 16/150 |

FOREIGN PATENTS OR APPLICATIONS

| | | | |
|---|---|---|---|
| 970,771 | 9/1964 | United Kingdom | 16/150 X |
| 1,099,154 | 8/1955 | France | 16/150 X |

*Primary Examiner*—Geo. V. Larkin
*Attorney, Agent, or Firm*—St. Onge Mayers Steward & Reens

[57] ABSTRACT

A flexible longitudinally continuous tape construction is disclosed for use in joining mating edges of juxtaposed members, the tape having an X-like configuration transversely of its length to provide legs adapted to receive and be secured to the edges of the members to be joined. The tape is capable of serving as a pliable hinge to permit articulation of the joined members, or it may also serve simply as a binding for joining members intended to be fixed relative to each other. The tape construction combines longitudinally continuous marginal web portions or carriers, forming the extremities of the legs of the X, with longitudinally spaced strand or equivalent connector means running crosswise of and interconnecting pairs of marginal web portions. The connector means intersect and interlock forming the axis of the X-like configuration.

25 Claims, 34 Drawing Figures

FIG. 1
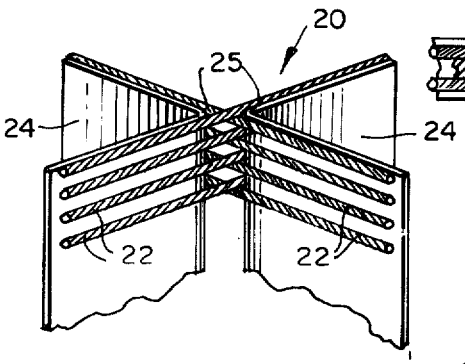
FIG. 5
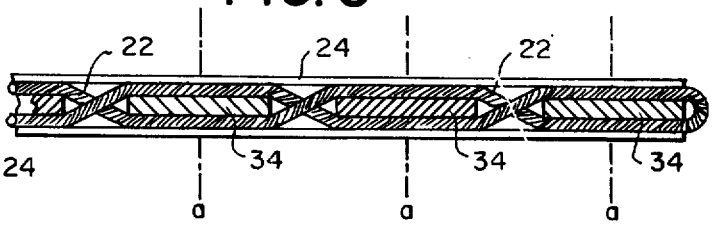
FIG. 6
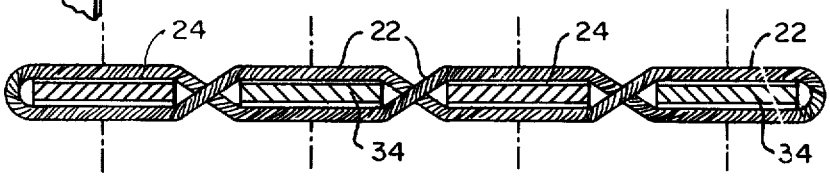
FIG. 2
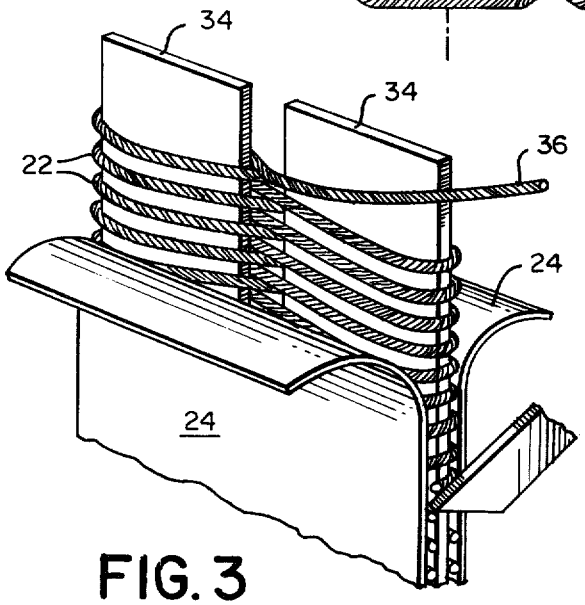
FIG. 32
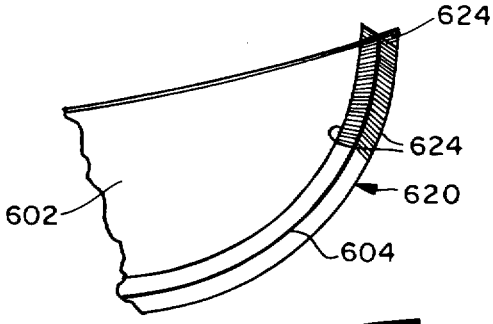
FIG. 3
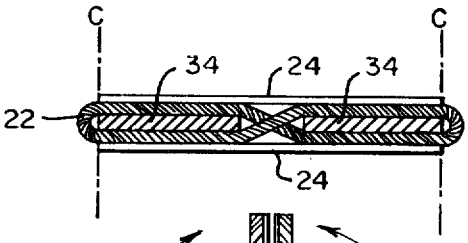
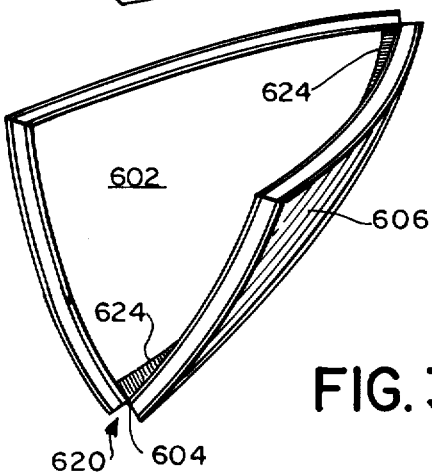
FIG. 33
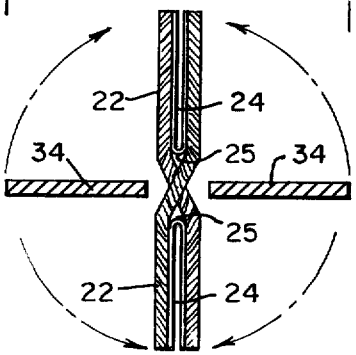
FIG. 4
INVENTOR.
ALFRED W. WAKEMAN
BY Steward & Steward
his ATTORNEYS

PLIABLE TAPE STRUCTURE

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of my prior copending application Ser. No. 859,619, filed Sept. 22, 1969 [.] *now abandoned.*

1. Field of the Invention

This invention pertains to continuous length, pliable tape structures useful in joining mating edges of adjacent members for making rigid or hinged connection between such members.

2. Prior Art Background

The limiting strength of conventional hinged or jointed structures utilizing sheet or panel members to form the structure is the ability of such members to carry localized stresses at points of attachment. There has accordingly existed for some time a need for better means of joining the edges of materials having relatively low resistance to localized loading stresses, such as the imposed by rivets screws, spot welding and the like. Sheet or panel materials which are particularly involved include formed plastic sheet, foamed core/stressed skin laminates, corrugated board, chipboard, felt laminates and similar light weight, low cost but easily rupturable stock which is commonly used in fabricating containers or other vessels, display structures, protective table pads, folio covers, etc.

Various tape constructions for joining mating edges of such materials have been advanced heretofore. A common arrangement is illustrated in Pats. Nos. 589,504, 1,260,197, 1,833,469 and 3,035,752 where the junction is formed by fabric or paper strips or tabs which are simply glued to the faces of the members to be joined. One particular difficulty with these arrangements is their poor resistance to peeling of the tabs from the faces of the joined members when forces are applied tending to move the members bodily relative to each other. Another form is illustrated in U.S. Pats. Nos. Re. 18,204, 1,998,036, 2,025,926, and 3,442,415. This form of joint-forming tape is characterized generally by the employment of two, coextending tapes which are stitched together along their center lines to form an X-like configuration in cross section. The legs of the X are then glued or otherwise secured to the margins of the members to be joined. This represents an improvement over flat tape but the stitching, falling as it must at the axis of the hinge, weakens the structure at its most critical location. Still another approach used for hingedly joining members is represented by the constructions shown in Pats. Nos. 46,071, 570,365 and 2,219,524. The arrangements there shown are not longitudinally continuous of the joined edges, so that a plurality of separate hinges must be used; and their attachment to the members to be joined presents problems. Molded plastic hinges of the type illustrated in Pats. Nos. 3,202,310 and 3,301,430 are designed to provide a continuous joint along the mating edges, but here again a problem is encountered in providing suitable means for securing such joint-forming constructions to the panel members.

SUMMARY OF THE INVENTION

The present invention provides a pliable tape structure which can be manufactured in continuous lengths and easily cut to any desired length for application to the members to be joined, much the same as ordinary pressure-sensitive tape is applied to a surface but which avoids the short-comings of prior tape arrangements discussed above. The novel tape structure is designed to take advantage of the highest tensile strength-to-weight ratio of any material form, namely that of the filament. The invention applies this high strength property to hinges or joint-forming tape without creating localized stress points in the resulting structure, as the tape configuration puts the entire attachment area (glue or other bonding agent) in shear only and eliminates peel forces.

As mentioned, the novel tape may serve to join both articulated and non-articulated members and one of the principal objectives of the invention is to provide a hinge or joint-forming tape structure which affords uniform distribution of attachment stress over as large an area as practical of the members which it is desired to join, thereby avoiding localized or concentrated stresses at points of attachment, while minimizing susceptibility to peeling. In this way, advantage can be taken of materials of low cost but stress-oriented nature, such as paperboard, expanded or foamed plastic, etc., for use as basic structural members, without the need and attendant expense of special reinforcement or auxiliary construction at the point of attachment. The invention makes possible better application of maximum material properties to achieve great strength-to-weight ratios in joined structures.

Other objectives include greater ease of application of the tape to members to be joined, and provision for specialized engineering applications, such as that involved in rolling hinges or in hingedly joining members whose mating edges are curved.

Use of the novel tapes for purposes other than hinging applications is of advantage where members to be secured together are subjected to loading or other forces tending to shift one member bodily relative to the other. The invention enables loadbearing structures such as display stands, mock-ups of prototype equipment, cartons or containers of various configurations, to be made of relatively low strength sheet stock. By joining members or sections of these devices with tape of the design herein disclosed, the inadequacy in peel strength of conventional pressure-sensitive adhesive or mending tape is largely overcome.

In accordance with the teaching herein, engineering advantage is taken of inherent tensile strength in pliable fabric, strand or sheet materials, when used in the tape configurations disclosed, to form continuous length tape structures which are easily applied to the members to be joined, and which distribute the attachment stresses uniformly over the adjacent edges of joined members, thereby reducing the chance for failure of the materials at such locations.

Briefly, the tape structures of the invention are comprised generally of two essential sets of elements. One set of elements consists of pliable strands, or equivalent connector means, disposed to run transversely of the joint to be formed. The other set of elements consists of pliable web portions or carriers disposed to run longitudinally of the joint to be formed. Each transverse strand or connector element interconnects two of the longitudinal web portions and serve to support load stresses purely in tension, i.e. the maximum strength property of the strand. At least some of the cross strands alternate with [the] *and* intersect other such strands along the axis of the tape, forming an X-like configuration in cross-section of the tape. Adhesive is applied to the confronting faces of legs in two transversely oriented quadrants of the X for bonding the tape to the margins of the members to be joined, whereby the margins are clamped between adjacent legs in quadrants of the X-like tape on opposite sides of the tape axis.

Various embodiments of this basic combination and modifications thereof are illustrated in the accompanying drawings and are described hereinafter.

DESCRIPTION OF DRAWINGS

FIG. 1 is a perspective view showing a portion of a preferred form of tape structure embodying the invention;

FIG. 2 is a fragmentary elevational view in perspective showing one method of forming the finished tape of FIG. 1;

FIG. 3 is a view in cross-section on line 3—3 of FIG. 2;

FIG. 4 is a cross-sectional view similar to FIG. 3, showing rearrangement of the tape upon removal from the forming mandrels seen in FIG. 2;

FIG. 5 is a cross-section similar to FIG. 3, showing an arrangement for fabricating a number of tapes simultaneously;

FIG. 6 is a cross-sectional view of another arrangement for forming multiple tapes;

FIG. 32 is a broken view in perspective elevation of a foamed core/stressed skin panel member having a curved edge with a tape secured along such edge; and FIG. 33 is a similar view showing a pair of curved-edge members of FIG. 32 joined by the tape.

DESCRIPTION OF THE PREFERRED EMBODIMENTS

Figure 7:
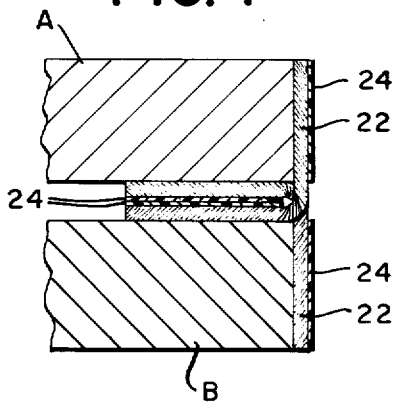
FIGS. 7–12 are fragmentary cross-sectional views of different types of hinged members and hinging arrangements using the tape of FIG. 1.

Tape structure 20 illustrated in FIG. 1 is composed of alternating runs of intersecting flexible strands 22 producing an X-configuration, and carrier strips 24 running lengthwise of the tape axis in transversely opposite quadrants of the X. Each of carrier strips 24 is folded lengthwise at 25 and extends continuously between adjacent legs in each of two opposite quadrants of the X. Each of strands 22 is secured at its opposite or cross-axis ends to margins of opposite carrier strips 24 by suitable adhesive. Collectively the strands in each opposite pair of legs of the X form a mat in conjunction with the associated carrier strips. In order to allow free intersection and lateral cross-over of the strands at the tape axis, the carrier strips are positioned to dispose their fold lines 25 slightly outwardly of the tape axis.

As will be more fully described presently, tape 20 is adapted to be applied along the mating edges of two members to be joined. To this end the edges of the members are received between adjacent tape legs in transversely opposite quadrants of the X-configuration, and adhesive is applied to the confronting faces of such legs to bond them to the margins or edges of the members. It is apparent that the members to be joined may be received in either of the two different sets of opposed quadrants of the tape. Where the members are received in the quadrants in which the carrier strips 24 are located, the carrier strips serve as barriers to prevent glue or other adhesive working into the axis of the tape. That is important where the tape is used as a hinged connection between members, since glue in the axis will impair the freedom of the hinging action of the connecting strands 22. Also the carrier strips serve in such case to prevent wear of the strands on a rough or sharp edge of the hinged member. In cases where the tape is employed simply for joining non-articulated members, these considerations are not so important; in fact it may even be of advantage to use the alternate set of quadrants so that direct glued contact of the strands 22 to the members being joined is obtained.

In the preferred construction shown in FIG. 1, hinge 20 is intended to be quite flexible so that it may be easily applied in a manner similar to that in which ordinary pressure-sensitive tape is applied to a surface. For that reason both the carrier strip 24 and the transverse strands 22 are of pliable material. Typically useful materials for the carrier strips include paper, more especially craft or crepe paper, woven textile webbing or light plastic film or tape. In fact various types of presently available commercial pressure-sensitive masking tape can conveniently be used for the carrier strip. Strands 22 may be multifilament textile threads or cords, natural or synthetic, as well as monofilament strands of organic or inorganic, e.g. metallic, material.

In FIGS. 2–4 a method is illustrated for handfabrication of tape of the type shown in FIG. 1. To this end there is provided a pair of elongated flat mandrels 34 suitably supported in edgewise spaced parallel relation. Cord 36 is wound about the mandrels in figure-8 manner to form the mat of strands 22 comprising the connector elements of the completed hinge. Pressure-sensitive tape is then applied over the cord on opposite faces of the mandrels to secure all of the courses or runs of the cord in fixed position relative to each other. A knife or other sharp instrument is then used to sever the terminal bends of each convolution of the cord where is passes around the outer edges of mandrels 34, cutting along plane c—c as shown in FIG. 3. The preliminary tape hinge assembly may then be easily slipped off the mandrels. The legs of the tape hinge are then folded into reverse relationship from that in which they are formed on the mandrels, to the position shown in FIG. 4, so that the margins of each strip 24 are placed in back-to-back relation.

Methods suitable for commerical production of the tape are shown in FIGS. 5 and 6 in which a plurality of mandrels 34 is employed and cord is woven continuously about these to build up a wide mat of any desired length. In FIG. 5, the opposite faces of this mat are then covered with sheets 36 of paper, cloth, plastic film or the like, which are glued or otherwise bonded to the cord. The finished mat is then cut by suitable slitting knives (not shown) advanced against and along the opposite faces of the mandrels, the knives being spaced on the center lines a—a of mandrels 34 to slit the composite mat lenthwise of the mandrels and form a plurality of separate ribbons or tapes. These are removed from the mandrels, as in FIG. 4. FIG. 6 illustrates a similar method of manufacture but in this case each mandrel 34 is first faced or wound with the material which will serve as the carrier strips, and then the cord is woven about the mandrels in figure-8 manner as before. Alternatively, the tape can be woven without the mandrels, using the carrier strips as the warp elements for the cross strands.

The tape hinge can be applied to the edges of the members to be joined using either set of diametrically opposed hinge quadrants for receiving and securing the members. Also various types of hinge arrangements can be accommodated. This is illustrated in FIGS. 7 through 12 of the drawings. In each of these illustrations the members to be joined are received in the tape quadrants which do not contain carrier strips 24. For some applications, this has an advantage, as can be seen by reference to FIG. 7. Any tendency of strands 22 to peel away from the surface of the hinged member A or B to which they are bonded is resisted by the interpositioning of the carrier strips 24. That is, strands 22 must cut through the interposed carrier strip if forces are applied to members A and B tending to separate them bodily.

Figure 8:
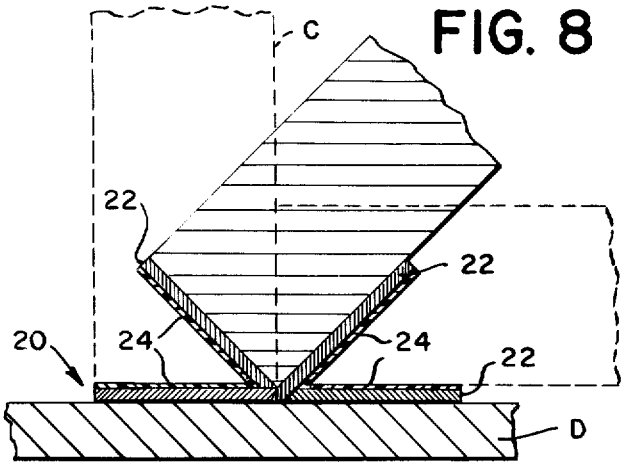
Figure 9:
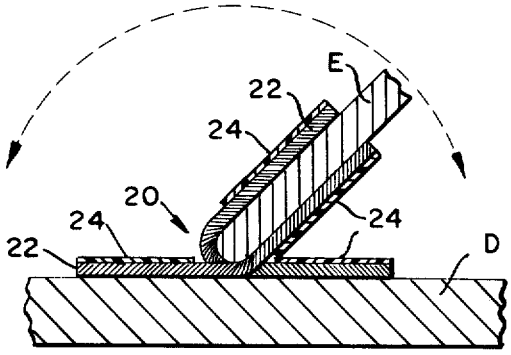

In FIG. 8, hinge 20 connects a relatively thick member C to a flat surface D to permit swinging of member C through an arc of 90°. In FIG. 9, member E is hinged to the flat surface D for swinging movement through an arc of 180°. In this illustration, member E is relatively thin and the legs of hinge 20 are secured to it along opposite margins of the faces rather than along one edge and the adjacent face as is necessary with a thick member.

Figure 10:
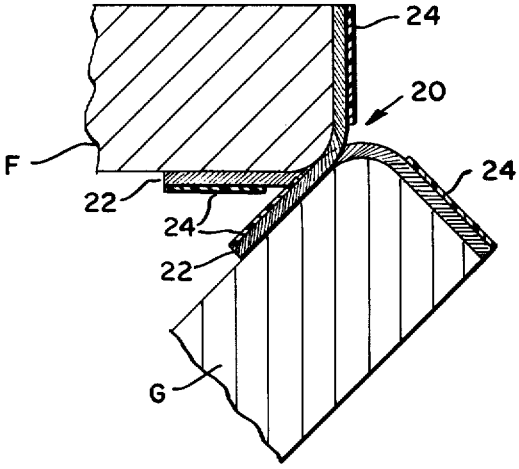
Figure 11:
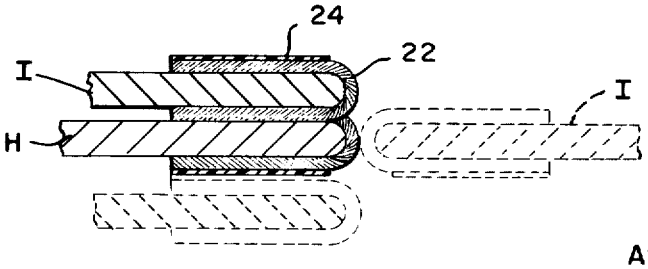

FIGS. 10 and 11 also illustrate rolling hinges, the one in FIG. 10 providing for 180° arcuate movement between the hinged members F and G, while FIG. 11 illustrates a hinge permitting 360° arc of movement for member I relative to member H. For this application, a centrally more open type of hinge is necessary. This can be readily provided simply by increasing the distance between the mandrels 34 in forming the hinge.

Figure 12:
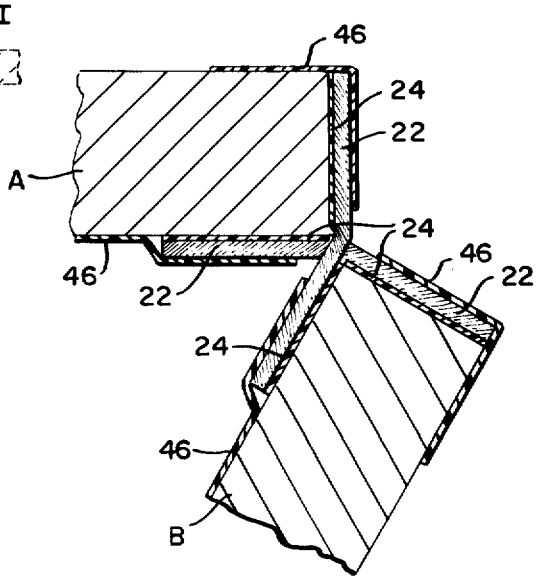

Further strengthening of the attachment of the hinge to the hinged members can be provided, as shown in FIG. 12, by applying and bonding overlying tapes 46 on one or both pairs of hinge legs.

Figure 13:
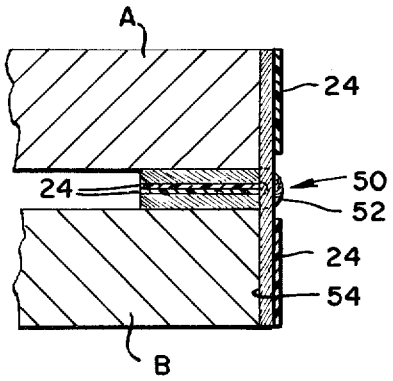
FIG. 13 is a fragmentary cross-sectional view of hinged members employing a modified type of tape hinge.
Figure 14:
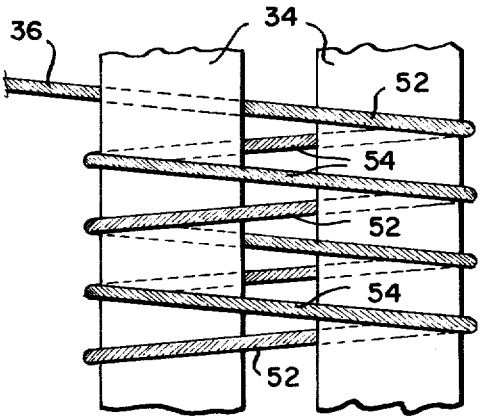
FIG. 14 is a fragmentary view of a jig structure illustrating the formation of a tape hinge of the type shown in FIG. 13.

For maximum strength in preventing separation of the hinged members at their limiting position of arcuate movement, a hinge structure such as that shown in FIG. 13 is useful. In this example, hinge 50 is generally similar to previously described hinge 20 except that some of the strands, while extending transversely of the hinge axis, do not cross laterally from one side to another in a given run of such strand; that is, such strands start and end on the same lateral side of the axis in that run. This is illustrated more particularly in FIG. 14 showing a method of constructing hinge 50 of FIG. 13. As before, a jig is used providing spaced mandrels 34, and a length of cord 36 is wrapped about the mandrels to form the strand runs. For clarity of illustration, the runs are shown in spread condition in the drawing but they would normally be closely spaced in actual practice. In this example, cord 36 is wound about the mandrels in alternate courses or runs, first with a figure-8 configuration in which strands 52 laterally cross the hinge axis intermediate the mandrels. In the next course the strands 54 are wound so as to pass completely around the outside of both mandrels without crossing between the mandrels. In other words, while strands 52 in transversly crossing the axis of the hinge move laterally from one side to the other of the mandrels, alternate strands 54 remain on the same lateral side of the mandrels.

In the resulting hinge construction illustrated in FIG. 13, (after applying carrier strips 24, cutting the terminal bends of the strands to release the hinge from the jig and applying the hinge to members A and B), each strand 54 extends directly across the hinge axis from one member to the other in the limiting position of the hinged members as shown. Such strands are thus in straight tension, providing maximum resistance to separation of the hinged members and to any tendency toward peeling of the intermediate strands 52 from margins of the hinged members. In the alternate limiting position of members A and B, strands 52 extend straight across the hinge axis and provide resistance to separation.

Figure 15:
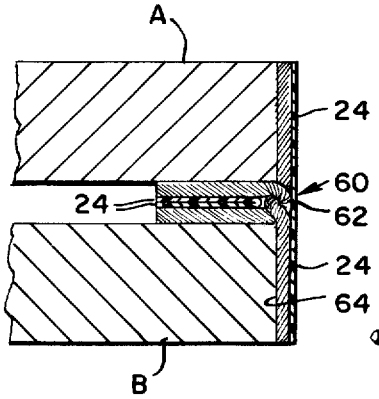
FIG. 15 is a fragmentary cross-sectional view of another form of tape hinge construction.
Figure 16:
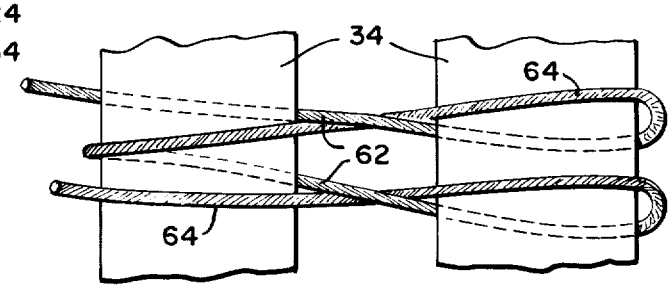
FIG. 16 is a view similar to that of FIG. 14 illustrating a manner of forming the tape hinge of FIG. 15.

FIGS. 15 and 16 illustrate a further modification of the preceding example. In this example hinge 60 [incorporporates] *incorporates* an interlocking or overlapping of the strands at the hinge axis. This is accomplished by winding cord 36 about mandrels 34 with a twist at each run, forming a series of interlocking clove hitches as shown in FIG. 16. It will be noted from the drawing however that although each strand 62 or 64 in any given run from one mandrel 34 to the other is positioned on the same lateral side of both mandrels, the strand is laterally displaced intermediate the mandrels by intersection with and overlapping of the strand of the correspondingly opposite run on the other side of the mandrels. The hinge 60 which results thus puts on strand in straight tension, e.g. strand 64 in FIG. 15, in the hinged structure.

Figure 17:
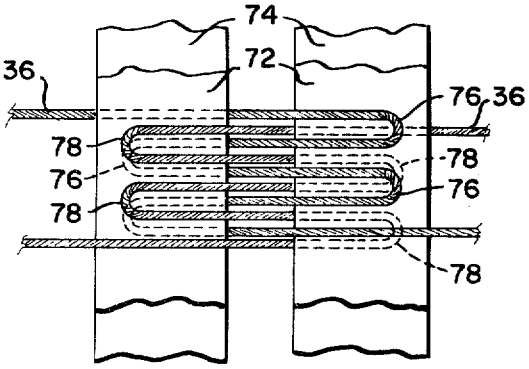
FIGS. 17 and 18 are fragmentary views of additional tape hinge constructions.
Figure 18:
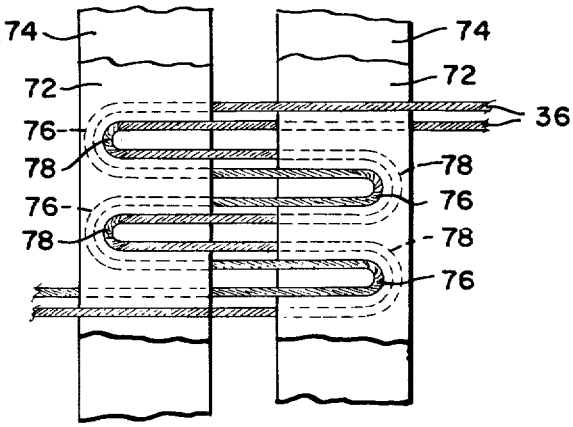

Another method of forming tape hinges of the invention is illustrated in FIGS. 17 and 18 wherein the cord used in forming the transverse strands is not cut or severed as in the previous examples. In both of these illustrations the carrier strips consist of pressure-sensitive tapes 72, 74 and the hinged structure is formed using two pairs of the tape strips in back-to-back relation, one pair on either side transversely of the hinge axis and each pair having the inner edges spaced from the other a distance sufficient to permit passage of the strands between the paired strips in passing from one lateral face to the other.

In forming this type of hinge structure, two separate lengths of cord 36 are required. In FIG. 17, the two lengths are interwoven or interlocked intermediate the loop portions 76, 78 which are adhered to the faces of the strips. In FIG. 18 the arrangement is essentially the same but does not embody interlocking of the two strands within each loop.

Figure 19:
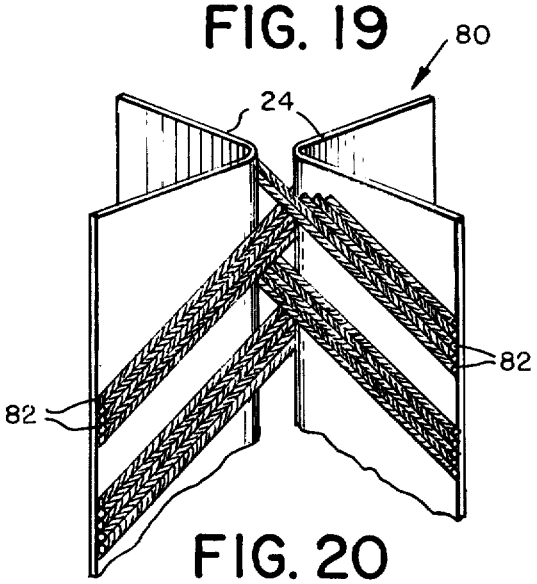
FIGS. 19 and 19A are perspective views of tape structures similar to FIG. 1 but employing multiply grouped strands or strips crossing on the bias.

Multiple cords are used in forming tape 80 also, as seen in FIG. 19. This tape can be formed as described in connection with FIGS. 1–4, except that instead of using a single strand of cord to form the runs, a group 82 of parallel cords is woven about the mandrels. The number of cords in the group will determine the angle or bias of the group in respect to the axis of the X; the greater the number of cords, the greater the bias angle.

Figure 19A:
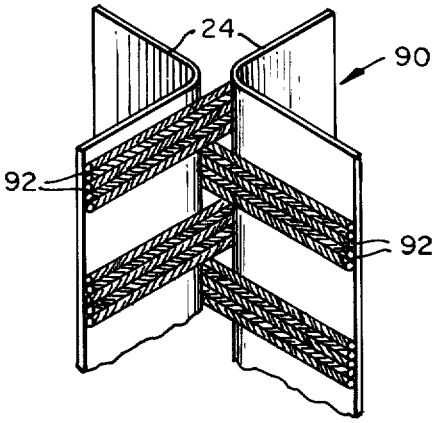

A similar arrangement is shown in FIG. 19A where again a plurality of cords is wound simultaneously as above, but in this case the cords [were] *are* wound about a series of mandrels, as in FIG. 5. Depending on the width of the composite group of mandrels, each run of grouped cords 92 will cross the tape axis at little or no bias in connecting carriers 24. In place of the grouped cords, webbing or tape of various sorts can be used to provide equivalent connector means.

Figure 20:
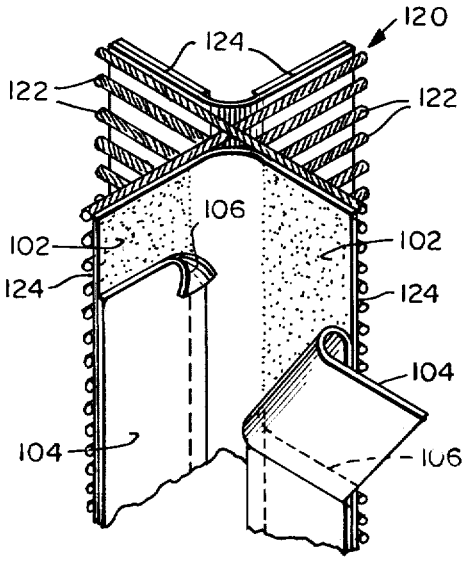
FIG. 20 is a perspective view of a tape structure similar to FIG. 1 but incorporating pressure-sensitive adhesive and protective release strips.

Attachment of the finished tape product to the members to be joined is facilitated by incorporating pressure-sensitive adhesive with the tape, as produced, so that it is self-containined ready for application as purchased. FIG. 20 illustrates such an arrangement. The basic tape structure is the same as that shown in FIG. 1, but in this case tape 120 includes bands of pressure-sensitive adhesive 102 extending lengthwise of the tape on confronting faces of the carrier strips 124 in opposite quadrants of the X. In the preferred construction, adhesive 102 does not extend into the center of carriers 124, but is confined to the margins of the tape. Temporary protection in the form of peel or release strips 104 are applied over the adhesive, the strips being made wider than the bands on adhesive so as to overlap at the inner edge and provide a convenient free tab 106 by which to start the peeling off of strips 104 when the tape is to be applied to members to joined.

Figure 21:
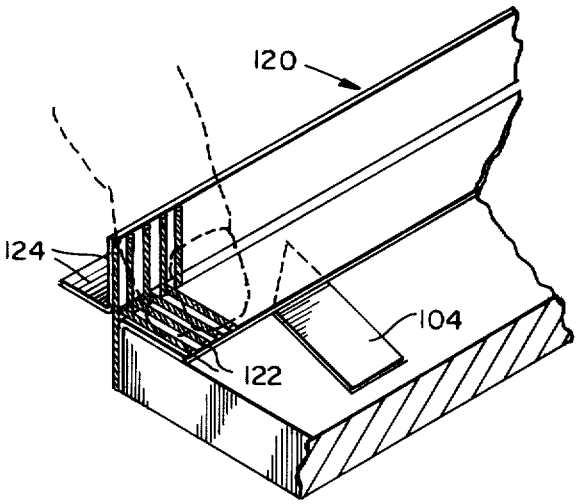
FIG. 21 illustrates the manner of applying the tape of FIG. 20 to one member which is to be joined to another.

In attaching the tape, one release strip is first completely stripped from one leg and that leg is pressed along an edge of the member to be joined. See FIG. 21. The adjacent leg of the tape is lifted to get access to free tab 106 of its release strip 104 which is then peeled back at 90° to the tape axis. As this strip 104 is pulled, it releases next to the X axis first and then diagonally outwardly across the face of tape 120, pulling it firmly against the edge of the member to which it is being attached. This leg of the tape is simultaneously pressed into contact with the face of the member and the process is repeated in securing the other two legs of the tape to the opposite member.

The arrangement not only facilitates the attachment process, providing a smooth, tight surface contact between the tape and members but aids in getting alignment of the tape axis and the abutting edges of the members, even if there is some initial misalignment due to improper starting placement of the tape. By pulling the release strip in the manner discussed, the tape is made to lie straight and its natural axis is caused to conform closely with the edge of the member to which it is attached so as to produce a rigid axis in the finished structure. In speaking of "natural axis" above, this is intended to mean not so much the axis defined by the crossing strands in the tape as it exists before application to the edges of the numbers to be formed, but rather to that axis defined by the crossing strands as this is developed upon securing the tape to the members to be joined. The two conditions are identical in the case of a perfectly applied tape to prefectly straight, aligned edges of members to be joined. But such ideal condition seldom exists in practice, and it is one of the virtues of the novel tape that such perfect condition need not exist, because the tape will align itself to accommodate irregularity of the edge and/or inexact application to those edges, without resulting in a loose or wobbly hinged joint. This feature arises inherently from the tape construction wherein the flexible connector strands, in crossing between web portions to which their ends are connected, are free to shift relative to each other, within of course the limits of their points of connection to the longitudinal web portions.

Figure 22:
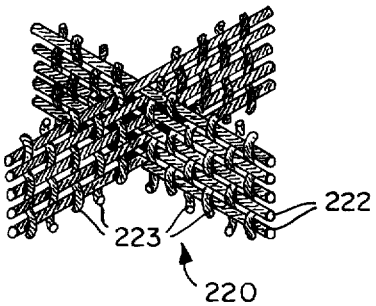
FIG. 22 is a fragmentary perspective view of an integrally woven tape structure incorporating the invention.
Figure 23:
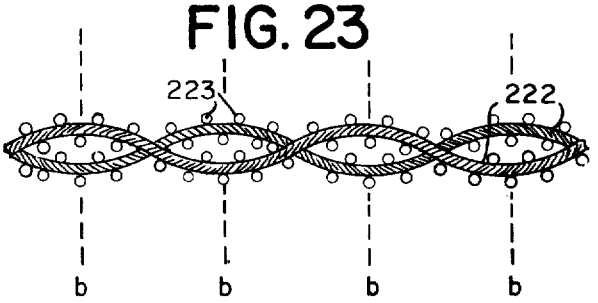
FIG. 23 is a cross-sectional view of a woven structure from which tapes of the form shown in FIG. 22 are cut.

Still another form of tape is shown in FIG. 22. Tape 220 is woven on a suitable loom to produce an integral structure in which weft threads 222 of the webbing form the cross-connectors for marginal or selvage portions produced by interweaving threads 222 with longitudinal or warp threads 223. Separate carrier members are accordingly not required in this arrangement. Self-sticking adhesive and protective peel strips can of course be incorporated in this form of tape, similar to that, described above. Tape 220 can be produced initially in multiple widths, as shown in FIG. 23, by a process similar to that described in connection with FIG. 5, but without using mandrels and slit on lines b—b to produce separate tapes.

Figure 24:
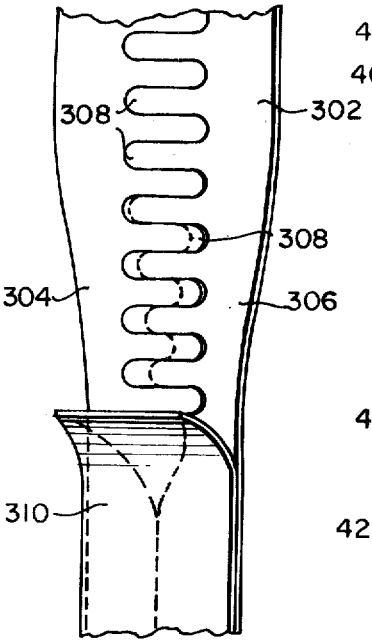
FIG. 24 is a perspective view of another form of tape incorporating the invention, in which the manner of forming the tape is illustrated.
Figure 25:
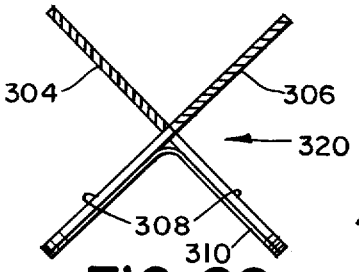
FIG. 25 is a cross-sectional view of the finished tape seen in FIG. 24.

Yet another form of the invention is illustrated in FIGS. 24 and 25 where a continuous strip 302 of paper or sheet plastic is slit in sinusoidal manner along its longitudinal axis to produce complementary left and right strips or marginal portions 304, 306 having mutually projecting fingers 308. These strips are then pressed laterally together to cause them to intermesh, with the fingers 308 of one overlapping the respective marginal portion 304 or 306 of the other. An imperforate strip 310 is then applied to the intermeshed and overlapped first members 304, 306, and bonded by gluing or welding to the tips of the fingers of those members. Strip 310 is creased longitudinally, causing the free edges of the members to separate and form the X-like tape 320, as seen in FIG. 25.

Figure 26:
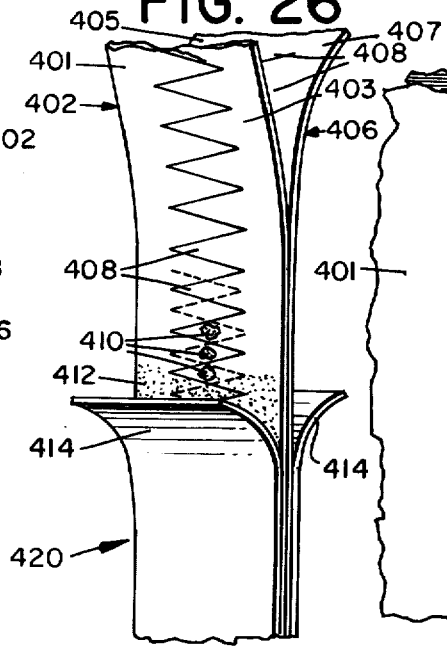
FIG. 26 illustrates still another form of tape embodying the invention, and a means of fabricating such tape.
Figure 28:
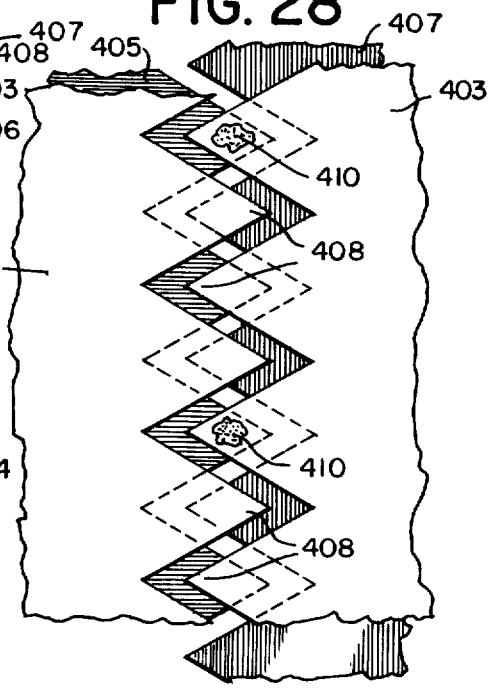
FIG. 28 is an enlarged, fragmentary view of the tape structure of FIG. 26.
Figure 27:
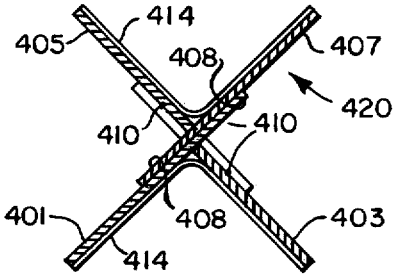
FIG. 27 is a cross-sectional view of the finished tape of FIG. 26.

FIGS. 26 and 27 show another tape structure 420 incorporating the invention. In this case two strips 402, 406 of suitable sheet stock are slit longitudinally along a central sinusoidal line to produce left and right marginal portions 401, 403 and 405, 407, all having teeth 408. Strips 402 and 406 are brought together in such manner that the teeth of one are out of phase, longitudinally of the tape, with those of the other so that the peaks of the teeth overlap. The overlapped peaks are glued or otherwise bonded together at 410, and the marginal portions separated to form the X-like configuration, as seen in cross-section in FIG. 27. Preferably the marginal halves of each strip 402, 406 are first laterally separated, as seen on enlarged scale in FIG. 28, before the overlapping teeth 408 are bonded together. This provides more freedom and reduces binding along the axis of the tape. Again, the marginal web portions may have a band of self-sticking adhesive 412, by which to secure the tape to the edges of the members to be joined, in which case a release or peel strip 414 is provided to protect the adhesion areas until the tape is to be used.

Figure 29:
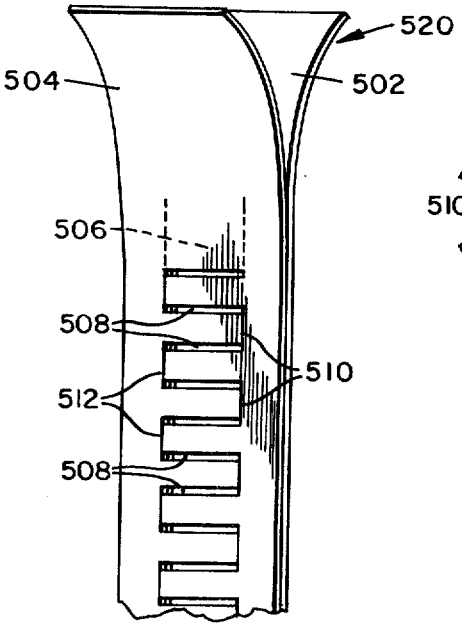
FIG. 29 is a perspective view of another form of tape and a method of making it.
Figure 30:
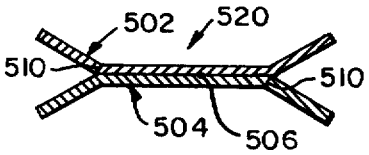
FIGS. 30 and 31 are cross-sectional views of the tape of FIG. 29 in partially completed and fully completed condition.
Figure 31:
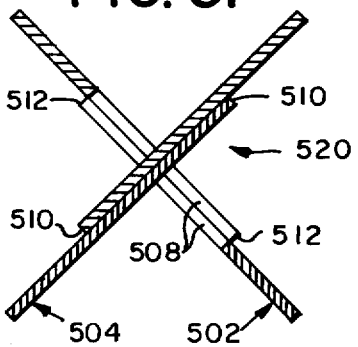

In FIGS. 29 to 31, a tape 520 is formed by joining two strips 502, 504 by welding or gluing along a central portion or band 506, and then cutting a series of slots 508 across band 506, spaced longitudinally along the tape. Next, each strip 502, 504 is slit at 510, 512, respectively, longitudinally between slots 508 at alternate ends of adjacent slots. Slits 510, 512 are also alternated in the confronting strips 502, 504 along the tape so as not to coincide at any point. Separating the legs or marginal portions of strips 502, 504 results in an X-shaped tape section, as shown in FIGS. 30 and 31.

Application of tape to curved edges of members is illustrated in FIGS. 32 and 33. In FIG. 32 a semiflexible member 602 has a curved edge 604 which is to be joined to a similar curved edge of panel member 606 (see FIG. 33). Tape 620 of the construction shown in FIG. 20 is used but to facilitate obtaining a smooth fit of the tape to the curved edge, the carrier strip members 624 of tape 620 are preferably formed of crepe paper to permit some stretching of the tape during application. When the free edges of members 602 are separated, after curved edges 604 are joined, a geodesic structure is obtained as seen in FIG. 33. Any slight longitudinal accommodation necessary along curved edge 604 as the structure is [foRmed] *formed* is readily permitted by the elasticity of tape 620. FIG. 33 also illustrates the use of light weight, low cost laminated, foamed or [honey combed] *honeycombed* core/stressed skin panels to form geometric structures, where the panels will not resist highly localized loads imposed by the use of rivets or screws as fastening means. Ordinary flat tape if used in such a construction may overcome the problem of localized attachment stress, but is [partlcularly] *particularly* vulnerable to peeling forces in the situation here illustrated.

What is claimed is:

1. A flexible tape for joining mating edges of adjacent members, said tape having an X-like configuration in cross section and providing a longitudinally continuous structure adapted to extend along and be secured to the edges of the members to be joined so that the axis of said X-like configuration coincides generally with the juncture formed by the members to be joined, said tape comprising carrier strip means comprising pliable, longitudinally continuous, marginal web portions at the extremities of the legs of the X; and flexible, spaced, connector means running crosswise of and [being secured] *bonded* to and interconnecting pairs of web portions, at least some of said connector means intersecting and crossing other connector means to form said X-like configuration [.], *said flexible connector means in crossing between said web portions being free to shift relative to each other within the limits defined by their points of connection to the respective longitudinal web portions.*

2. A flexible tape as defined in claim 1, wherein at least some of said connector means join pairs of transversely opposite web portions.

3. A flexible tape as defined in claim 2, wherein said carrier strip means extends continuously between adjacent legs in each of two opposite quadrants of the X-like configuration.

4. A flexible tape as defined in claim [3] *23*, wherein said adhesive is of the pressure-sensitive type and is confined to the outer margins of confronting faces of said carrier strip means, said tape further including temporary protective release strips covering said adhesive but peelable therefrom to expose said adhesive when said tape is applied to the members to be joined.

5. A flexible tape as defined in claim 4, wherein the protective release strips overlap the inner margins of the adhesive to provide free tabs along such margins.

6. A flexible tape as defined in claim 1, wherein said connector means are biased longitudinally of the tape axis.

7. A flexible tape as defined in claim 1, wherein said connector means comprise alternately crossing flexible strands.

8. A flexible tape as defined in claim 1, wherein said connector means comprise alternately crossing groups of strands.

9. A flexible, continuous tape hinge for application along adjacent edges of members to be hingedly joined, said hinge have an X-like configuration in cross section and said hinge comprising carrier strip means of pliable sheet material running lengthwise of the hinge on transversely opposite sides of its axis; and flexible strands running crosswise of said axis and carrier strip means, each strand having its cross-axis ends secured to faces of opposed carrier strip portions, at least some of said strands intersecting and crossing over other of said strands to form the hinge axis at their intersection.

10. A tape hinge as defined in claim 9, wherein the carrier strip portions are disposed in transversely opposed quadrants of the X-like configuration.

11. A tape hinge as defined in claim 9, wherein the carrier strip portions in each quadrant are integrally joined along the hinge axis.

12. A tape hinge as defined in claim 10, which further includes pressure-sensitive adhesive on the confronting faces of the legs of the X-like configuration in transversely related quadrants.

13. A tape hinge as defined in claim 12, wherein said adhesive coating is located on confronting faces of said carrier strips.

14. A tape hinge as defined in claim 12, which further includes flexible release strips covering said adhesive coating but peelable therefrom to expose said adhesive upon application of the hinge to members to be hingedly joined.

15. A tape hinge as defined in claim 9, wherein each of said flexible strands running crosswise of said axis and carrier strip means has its cross-axis ends secured to faces of said carrier strip means over a substantial portion of the width thereof.

16. A tape hinge as defined in claim 15, which further ncludes pressure-sensitive adhesive coating on at elast one tape face on each side of the hinge axis.

17. A tape hinge as defined in claim 16, wherein said pressure-sensitive adhesive coating is disposed on confronting faces of the legs of the X-like configuration in transversely related quadrants, said tape further including flexible release strips covering said adhesive coating but peelable therefrom to expose said adhesive upon application of the hinge to members to be hingedly joined.

18. A tape hinge as defined in claim 9, wherein the carrier strip portions are disposed in diametrically opposed quadrants of the X-like configuration and the strip portions in each quadrant are integrally joined along the hinge axis.

19. A flexible tape for joining mating edges of adjacent members, said tape having an X-like configuration in crosssection and providing a longitudinally continuous structure adapted to extend along and be secured to the edges of members to be joined so that the axis of said X-like configuration coincides generally with the juncture formed by the members to be joined, said tape comprising pliable longitudinally continuous carrier [strips] *means* forming the extremities of the legs of the X [in transversely opposite quadrants of the X]; and flexible, spaced, connector means running crosswise of and interconnecting [marginal portions of] opposite carrier [strips] *means, all of* said connector means intersecting and crossing [each other] alternately to *join diagonally opposite carrier means and* form said X-like configuration.

20. A flexible tape as defined in claim 19, wherein said carrier [strips] *means* are formed of stretchable sheet material.

21. A flexible tape as defined in claim 20 wherein said carrier [strips] *means* are formed of crepe paper.

22. A flexible tape as defined in claim 1, wherein said carrier strip means are formed of stretchable sheet material.

23. A flexible tape as defined in claim 1, which further includes adhesive disposed on confronting faces of said web portions in transversely opposed quadrants of the X, for securing said faces to edges of the members to be joined.

[24. A flexible tape as defined in claim 1, wherein said flexible connector means, in crossing between said web portions to which they are connected to form said X-like configuration, are free to shift relative to each other within the limits defined by their points of connection to the respective longitudinal web portions.]

*25. A flexible tape for joining mating edges of adjacent members,*

*said tape having an X-like configuration in cross-section and providing a longitudinally continuous structure adapted to extend along and be secured to the edges of members to be joined so that the axis of said X-like configuration coincides generally with the juncture formed by the members to be joined, said tape comprising*

*carrier strip means comprising pliable, longitudinally continuous, marginal web portions at the extremities of the legs of the X;*

*flexible, spaced, connector means running crosswise of and being secured to and interconnecting pairs of web portions, at least some of said connector means intersecting and crossing other connector means to form said X-like configuration; and*

*adhesive means disposed on confronting faces of said web portions in transversely opposite quadrants of the X for securing said faces to edges of the members to be joined.*

*26. A flexible tape for joining mating edges of adjacent members,*

*said tape having an X-like configuration in cross-section and providing a longitudinally continuous structure adapted to extend along and be secured to the edges of the members to be joined so that the axis of said X-like configuration coincides generally with the juncture formed by the members to be joined, said tape comprising*

*pliable, longitudinally continuous, film forming the extremities of the legs of the X; and*

*flexible, spaced, connector means running cross-wise of and being joined to said film on both sides of the X axis, said connector means intersecting and crossing each other alternately to form said X-like configuration.*

* * * * *